United States Patent Office 3,016,920
Patented Jan. 16, 1962

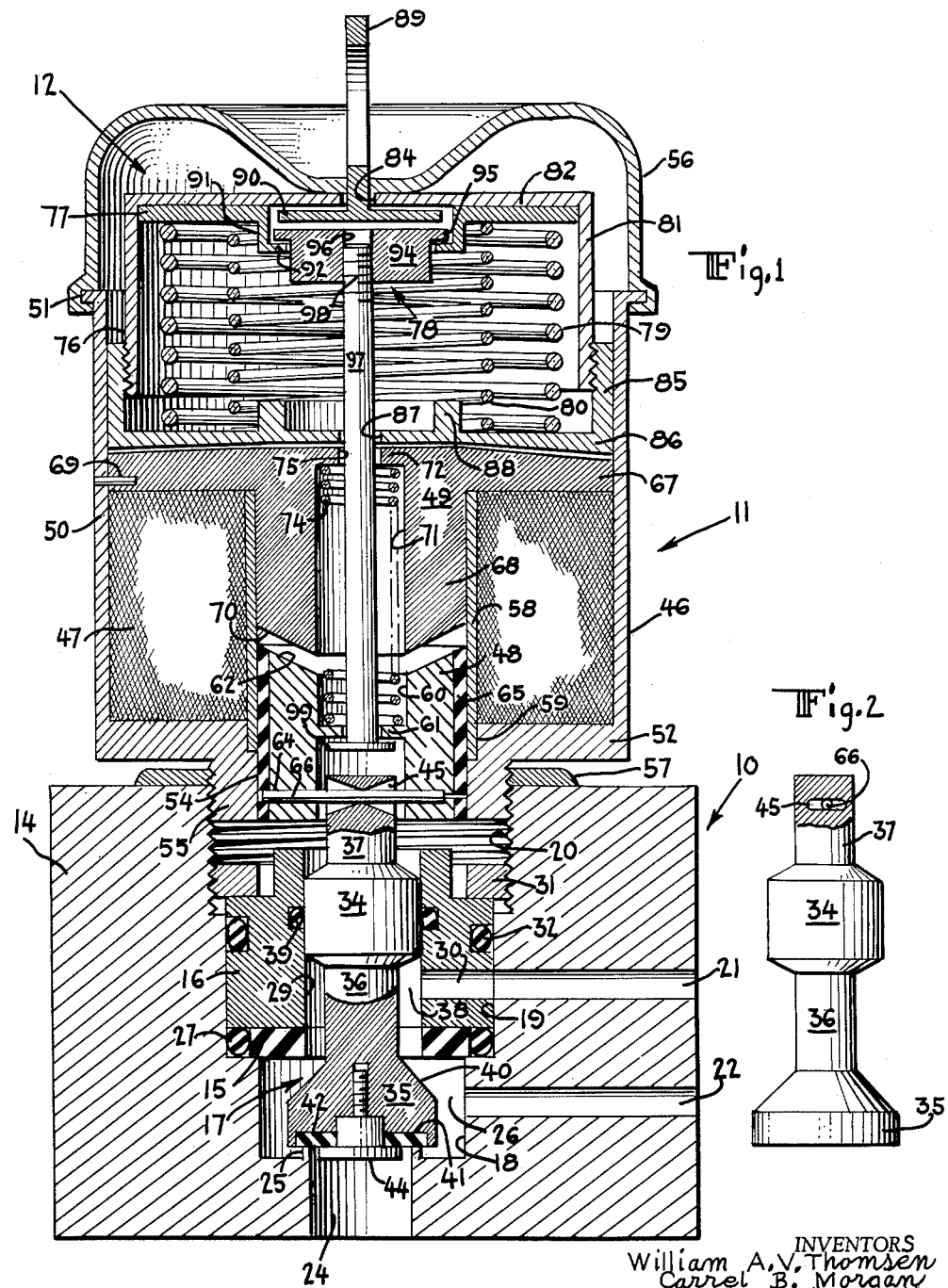

3,016,920
SOLENOID OPERATED VALVE UNIT
William A. V. Thomsen, Glen Ridge, Carrel B. Morgan,
Packanack Lake, and Bernard W. Quail, Scotch Plains,
N.J., assignors to Specialties Development Corporation,
Belleville, N.J., a corporation of New Jersey
Filed Aug. 6, 1957, Ser. No. 676,618
2 Claims. (Cl. 137—625.27)

The present invention relates to valves and valve actuation, and more particularly, to solenoid operated valve units.

In many fluid distribution systems, particularly in those used in aircraft, there is a demand for components which are compact, light in weight, have a long life, and can be produced at relatively low cost.

Solenoid operated valve units, which are used in such systems can be reduced in size and weight by reducing the size of the solenoid necessary to operate a valve requiring a given operating force. This can be accomplished by increasing the efficiency of the solenoid in converting electrical energy into mechanical thrust; by preventing any part of the thrust of the solenoid from being wasted in overcoming side force developed by misalignment of the solenoid and the valve; and by designing the valve so that the solenoid in operating the valve need overcome only the friction of the valve.

A conical face cylindrical armature type solenoid is commonly used in these applications, and its efficiency for this purpose may be increased by increasing the initial mechanical thrust which it develops from a given amount of electrical energy. Since the thrust of the solenoid increases as the air gap between the core and the movable armature decreases, the efficiency of the solenoid may be increased by setting the gap existing between the core and the armature when the solenoid is deenergized, at that minimum value which will just allow the movement of the armature toward the core (upon energization of the solenoid) to be sufficient to seat the valve member.

The efficiency of the solenoid may be further increased by maintaining the armature in a central position with respect to the bore in which it travels, so that the magnetic forces act uniformly with respect to the circumference of the cylindrical armature.

Previously, these methods of increasing the solenoid efficiency could be accomplished only by adhering to a very small tolerance between the distance from the conical face of the core to the valve seat and the distance from the conical face of the armature to the seating portion of the valve member; and between the diameter of the armature and the diameter of the bore in which it rides.

Likewise, a close alignment between the solenoid and the valve achieved by adhering to small tolerances, has been previously used to prevent the development of wasteful side forces in the valve.

However, units built to such small tolerances are costly to manufacture and have the further disadvantage of having an inherent short life because the core touches or nearly touches the armature after the solenoid is energized to seat the valve member. Therefore, any wear of the valve seat will cause the valve to leak since the armature cannot move farther toward the core to compensate for such wear.

Solenoid operated valve units are preferably provided with a mechanical valve actuator mechanism having an "override" feature which allows the actuator operating device to be moved past the point of complete valve actuation. Actuator mechanisms incorporating this "override" feature have previously been of considerable size and therefore have made for a bulky unit.

Accordingly, an object of the present invention is to provide a solenoid operated valve which accomplishes the aforementioned desired advantages but is compact, light in weight, has a long life, and is cheap to manufacture.

Another object is to provide such a unit in which the solenoid is highly efficient.

A further object is to provide such a unit in which the mechanical force developed by the solenoid is efficiently used in operating the valve.

A still further object is to provide such a unit which has an improved mechanical valve actuator mechanism including a compact "override" feature.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawing, forming a part of the specification, wherein:

FIG. 1 is a longitudinal sectional view of the solenoid operated valve unit in accordance with the present invention.

FIG. 2 is a side elevational view of the valve member with the upper portion thereof in longitudinal section at right angles as viewed in FIG. 1.

Referring to the drawing in detail and more particularly to FIG. 1 thereof, there is shown a solenoid operated valve unit in accordance with the present invention which comprises a valve 10, a solenoid 11 for operating the valve, and a mechanical valve actuator 12 for emergency operation of the valve in the event of power failure.

The valve generally includes a body 14, a valve seat 15 within the body, a retainer 16 for holding the valve seat 15 in place, and a valve member 17 adapted to cooperate with the valve seat 15. The body 14 is provided with a central stepped bore having a small diameter lower section 18, a larger diameter middle section 19, and a still larger diameter threaded upper section 20. The body 14 is also provided with a side inlet port 21 in communication with the middle bore section 19, and further is provided with a side outlet port 22 in communication with the lower bore section 18, and an end exhaust port 24 about which an annular valve seat 25 is formed.

The valve seat 15 is positioned at the bottom of the middle bore section 19 and together with the lower bore section 18 defines a lower valve chamber 26, and an O-ring 27 forms a fluid tight seal between the valve seat 15 and the body 14. The valve seat 15 is held in position by the retainer 16, which is positioned in the middle bore section 19, and is provided with a central bore 29 and an inlet passageway 30 providing communication between the bore 29 and the inlet port 21. The bore 29 is of a diameter equal to the outside diameter of the valve seat 25 to provide for balanced operation of the valve member 17 as will be described hereinafter.

The retainer 16 is held tightly against the valve seat 15 by the retaining nut 31, and an O-ring 32 provides a fluid seal between the retainer and the body 14. The valve member 17 extends through the bore 29 and includes an upper head portion 34, a lower head portion 35, a small diameter portion 36 connecting the upper and lower head portions, and a solenoid connecting portion 37 above the upper head portion. The upper head portion 34 together with the bore 29 defines an upper valve chamber 38, and a fluid seal is provided between the retainer 16 and the head portion 34 by an O-ring 39 seated in a groove formed in the retainer 16. The lower head portion 35 is provided with an upper conical valve surface 40 adapted to abut the valve seat 15, and with a lower cylindrical recess 41 in which a resilient washer 42 is held by a screw 44 to provide a lower valve surface adapted to abut valve seat 25.

The solenoid connecting portion 37 is provided with an opening 45 which in transverse cross section has an elongated slot configuration at the center of the portion 37 (as shown in FIG. 2). The upper and lower walls of the opening 45 diverge from the center toward the outer edges of the portion 37.

The solenoid 11 generally includes a casing 46, a coil 47, an armature 48, and a core 49. The casing 46 comprises an annular wall 50 provided with a continuous lip 51 at its upper end, an end wall 52 provided with a bore 54 and having a threaded cylindrical extension 55 about the bore, and a flexible boot 56 engaging the lip 51 and enclosing the upper end of the annular wall 50. The extension 55 is threaded into the upper bore section 20 of the valve 10 and is locked in place by a lock nut 57. The bore 54 is extended into the center of the casing by means of an annular sleeve 58 which is set into an annular recess 59 provided in the end wall 52.

The annular coil 47 is positioned between the sleeve 58 and the wall 50, and is supported by the end wall 52. The armature 48 is slidably positioned in the bore 54 and has a central bore 60 in which there is positioned an inwardly extending flange 61. The armature is also provided with a conical face 62 on the upper end thereof, a diametrical pin hole 64 through the lower end thereof, and a coating 65 of Teflon or similar material on the outer cylindrical surface thereof. A pin 66 is placed in the hole 64 and passes through the opening 45 in the valve member portion 37 to connect the valve to the solenoid armature for movement therewith.

The core 49 has a large diameter portion 67 in contact with the wall 50, and a small diameter portion 68 in the bore 54, extending toward the armature 48. A pin 69 extending through the wall 50 and into the core portion 67 locks the core 49 to the casing 46. The core portion 68 is provided with a conical face 70 on the end adjacent to the conical face 62 of the armature, and with a bore 71 which extends from this face 70 to a shoulder 72 at the upper end of the core. A spring 74, seated against the shoulder 72 of the core and the flange 61 of the armature, urges the armature away from the core. An opening 75 is provided in the shoulder 72 to accommodate a member of the mechanical valve actuator 12 about to be described.

The mechanical valve actuator 12 generally includes a cage 76, a plate 77 within the cage, a member 78 connecting the plate 77 with the armature 48, and springs 79 and 80 bearing against the plate 77 and the lower wall of the cage 76. The cage 76 comprises an upper portion 81 having a wall section 82 provided with a central hole 84, and a lower portion 85 screw threaded to the upper portion and having a wall section 86 provided with a central opening 87 about which is formed a spring retaining annular protrusion 88. An actuation link 89 having a flange 90 is positioned in the hole 84 to transmit motion from a linkage (not shown) to the cage 76. The plate 77 is held against the upper wall 82 by the concentric springs 79 and 80 and is provided with an annular protrusion 91 having an inwardly extending flange 92. The connecting member 78 consists of a nut 94 provided with a flange 95 and a threaded bore 96, and a stem 97 provided with a threaded portion 98 on one end and a flange 99 on the other end. The nut 94 and the stem 97 are interconnected by means of the threaded bore 96 and the threaded stem portion 98. The nut 94 is connected to the plate 77 by the engagement of the nut flange 95 with the plate flange 92 and the stem 97 is connected to the armature 48 by the engagement of the stem flange 99 and the armature flange 61.

In operation, when the solenoid is not energized, the spring 74 urges the armature 48 downwardly and holds the lower head portion 35 of the valve member 17 against the valve seat 25 as shown in FIG. 1. In this position, the inlet port 21 and the outlet port 22 are in communication and fluid pressure acts downwardly against valve surface 40, and upwardly against the lower surface of the upper head portion 34 and that portion of the lower surface of the lower head portion 35 which lies outwardly of the valve seat 25.

The total fluid force acting on the lower head portion 35 is equal to the force acting downwardly on surface 40 minus the force acting upwardly on the lower surface of the portion 35. Since the outer diameter of the valve seat 25 is equal to the diameter of the bore 29, it may be seen that the force due to the fluid pressure acting on the lower surface of the portion 35 cancels out that portion of the surface 40 lying outwardly of the bore 29. The total force on head portion 35 is therefore equal to the force on the head portion 34 and there is no tendency to move the valve member or to prevent its motion, whereby a smaller solenoid may be used to operate this valve than could be used to operate a valve in which unbalanced fluid forces must be overcome by the solenoid or by the spring against which the solenoid acts.

When the coil 47 is energized, the armature 48 is magnetically attracted to the core 49 and since the coating 65 on the armature provides a non-magnetic centering means, this magnetic force is equally distributed with respect to the armature and is efficiently utilized in providing axial thrust. As the armature 48 moves upwardly it carries the valve member 17 with it. Any misalignment between the axis of the solenoid 11 and the axis of the valve 10, which would otherwise cause a non-axial force to be transmitted to the valve member 17 from the armature 48, is compensated for by the pivotal connection provided by the pin 66 and the diverging opening 45 in the valve member section 37. The armature 48 and the valve member 17 move toward the core 49 until the valve surface 40 abuts the valve seat 15. The outlet port 22 and the exhaust port 24 are then in communication and the inlet port 21 is sealed off.

In order for the solenoid 11 to develop the maximum thrust from a given quantity of electrical energy, it is necessary that the distance between the face 62 of the armature 48 and the face 70 of the core section 68, when the solenoid is deenergized, be adjusted to that smallest distance which will allow the valve surface 40 to tightly abut the valve seat 15 as the face 62 meets the face 70. In order to achieve this adjustment, the solenoid is energized, the lock nut 57 is backed off against the end wall 52, and the solenoid is rotated so that the extension 55 is screwed into the upper bore section 20, thereby moving the core 49 (with the casing 46) downwardly until its face 70 contacts the armature face 62 and forces the armature 48 downwardly to unseat the valve surface 40 and allowing fluid to escape from the upper valve chamber 38. The solenoid is then rotated in the opposite direction until the leakage stops and the lock nut 57 is screwed against the valve body 14 to hold the adjustment. With this arrangement, wear of the seat 15, which would eventually cause the valve to leak, may be compensated for and the life of the valve increased.

In the event of electrical power failure, the valve may be operated through a suitable linkage (not shown) attached to the actuating link 89. A vertical pull on the link 89 causes the cage 76 to move upwardly. The flexible material of the boot 56 permits the boot to deform as the cage 76 moves upwardly. The plate 77, being held in place by the compressed springs 79 and 80, moves along with the cage 76 and through the nut 94 and the stem 97 of the connecting member 78, moves the armature 48 to actuate the valve. When the valve member 17 has completed its travel, further vertical motion of the link 89 causes the springs 79 and 80 to compress between the now stationary plate 77 and the moving lower cage wall 86 thus allowing the desired overtravel.

From the foregoing description, it will be seen that the present invention provides an improved solenoid operated valve unit in which the efficiency has been increased and size has been decreased to provide for compactness, light weight, and long life, without an appreciable increase in cost.

As various changes may be made in the form, construction and arrangement of the parts herein, without departing from the spirit and scope of the invention and without sacrificing any of its advantages, it is to be understood that all matters herein is to be interpreted as illustrative and not in any limiting sense.

We claim:

1. A device for controlling the flow of fluid medium comprising in combination a valve body providing an upper cylindrical chamber and a concentric lower cylindrical chamber of larger diameter, said upper chamber being provided with a side inlet opening, said lower chamber being provided with a side outlet opening and an end exhaust opening; a raised annular valve seat adjacent said exhaust opening, said valve seat being coaxial with said chambers and having an outside diameter equal to the diameter of said upper chamber; a second annular valve seat between said inlet opening and said outlet opening; an elongated valve member positioned in said chambers having an enlarged portion in said upper chamber adapted to seal said upper chamber, and a second enlarged portion in said lower chamber provided with a first surface adapted to abut said first valve seat and a second surface adapted to abut said second valve seat.

2. A device for controlling the flow of fluid medium comprising in combination a valve body having a chamber therein provided with an inlet and an outlet; a valve seat between said inlet and said outlet; a valve member in said chamber having a head portion adapted to abut said valve seat; a solenoid casing having a bore therein and attached to said valve body; a coil within said casing adjacent said bore and adapted to be energized by electrical energy; an armature slidably positioned within said bore and connected to said valve member; a cage within said casing having top and bottom walls and provided with link means extending therefrom for moving said cage away from said armature; a plate adjacent said top wall; a plurality of concentric springs in said cage bearing against said plate and said bottom wall; an elongated member connected to said armature; and means for coupling said elongated member and said plate to transmit motion of said plate to said armature, whereby movement of said cage away from said armature causes said plate to move with it under the action of said springs during the operation of the valve, continuing movement of said cage thereafter causing said springs to compress against said plate.

References Cited in the file of this patent
UNITED STATES PATENTS

| | | |
|---|---|---|
| 213,030 | Bartlett | Mar. 11, 1879 |
| 820,910 | Callan et al. | May 15, 1906 |
| 1,202,527 | Hynes | Oct. 24, 1916 |
| 1,402,718 | Armstrong | Jan. 3, 1922 |
| 1,758,645 | Betts et al. | May 13, 1930 |
| 2,399,843 | Adams | May 7, 1946 |
| 2,404,349 | Brant et al. | July 23, 1946 |
| 2,616,658 | Dombeck | Nov. 4, 1952 |
| 2,682,386 | Lindsay | June 29, 1954 |
| 2,797,061 | Buchanan | June 25, 1957 |